Feb. 20, 1962  F. B. CRAMER  3,022,149
PROCESS FOR DISPERSING SOLIDS IN POLYMERIC
PROPELLENT FUEL BINDERS
Filed Nov. 29, 1957
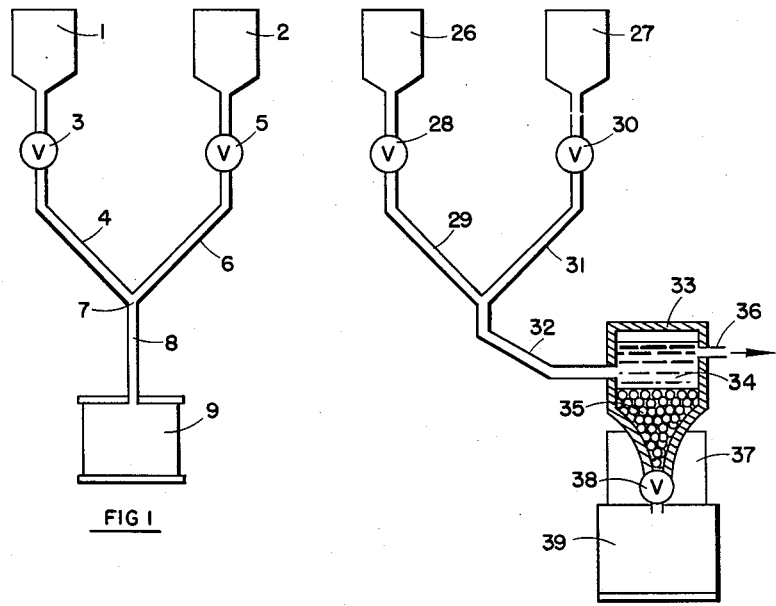
FIG 1
FIG. 3
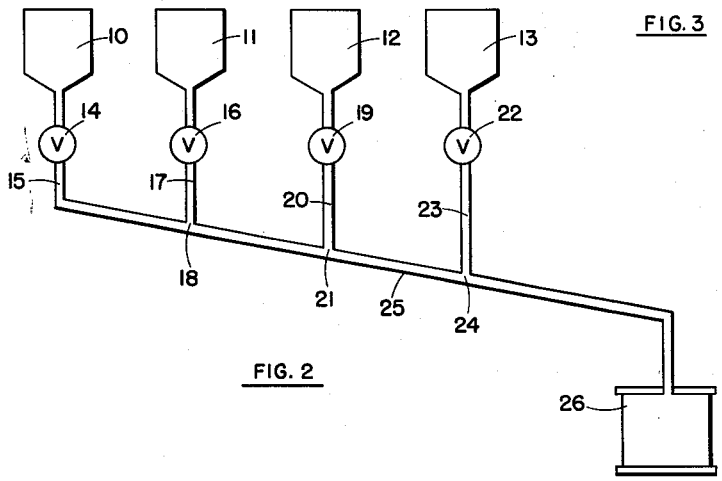
FIG. 2
INVENTOR.
FRANK B. CRAMER
BY Thomas S. MacDonald
ATTORNEY 3,022,149
PROCESS FOR DISPERSING SOLIDS IN POLYMERIC PROPELLENT FUEL BINDERS
Frank B. Cramer, Reseda, Calif., assignor to North American Aviation, Inc.
Filed Nov. 29, 1957, Ser. No. 699,632
16 Claims. (Cl. 149—19)

This invention relates to the manufacture of solid-containing polymeric materials. More particularly, this invention relates to a process for the manufacture of polymers containing substantially uniformly dispersed solid materials therein.

The conventional techniques for dispersing a solid material in a polymer or plastic involves a mixing of the polymer and solid material by a folding process in which it is hoped that through manifold folding of the matrix and the solids to be occluded, the components will ultimately be broken down to such a point that their macroscopic composition is substantially uniform. This is a slow, time-consuming process, and it requires that the entire batch of material be folded and refolded until, from a statistical viewpoint, it may be said that every ultimate layer of material has been broken and refolded. Another method of dispersing solids in polymeric or resin vehicles is by the use of a ball mill. In this case, the solid is ground in the presence of the vehicle which usually comprises a plasticizer and the resin or polymer solution. Grinding is accomplished by means of pebbles or steel balls which are tumbled in the mill together with the material being ground. These known methods are characterized by deficiencies which are not conductive to economy in the manufacturing process. A large amount of hand labor is required. The cycle of operation of mixing, whether it be by a folding process or the ball mill, is extremely long. The ball mill operation often results in contamination of the mixture by materials which have been abraded from the mill linings during the operation.

It is therefore an object of this invention to provide a process for dispersing solid materials in resinous and polymeric vehicles. It is also an object of this invention to provide a process for the manufacture of solid-containing polymeric and resinous materials of substantially uniform composition. Another object is to provide a process for the manufacture of rocket propellants. It is likewise an object to provide a process for the manufacture of solid-containing plastic or polymeric materials which require less labor and decreased process time. Still other objects of this invention will become obvious from the discussion which follows.

The above and other objects of this invention are accomplished by a process for the manufacture of mixtures of polymeric materials and filling substances which comprises providing at least one dispersion of polymerizable materials in non-solvent and non-reactive liquid dispersion mediums, and at least one dispersion of filling substances in non-solvent and non-reactive liquid dispersion mediums, said dispersion mediums being mutually miscible, mixing said dispersions together, permitting said dispersed materials and said dispersed substances to coalesce and form an agglutinate of substantially uniformly dispersed filling substances in said polymerizable materials. Curing agents, catalysts, and other ingredients besides the filling substance are added to produce certain compositions. These other components are included with the dispersions of the polymerizable materials if liquid in form, or with the dispersions of the filling substances if solid in form, or they are made up as separate dispersions in mediums which are miscible with the other dispersion mediums. In the latter case, all the dispersions are mixed together as explained above.

When only two dispersions are employed, one containing a dispersed polymer and/or resin, and another containing dispersed solid substances, the invention may be described as a process for the manufacture of mixtures of polymeric materials and filling substances comprising providing a first dispersion of a polymerizable material in a non-solvent and non-reactive liquid dispersion medium, and a second dispersion of a filling substance in a non-solvent and non-reactive liquid dispersion medium which is miscible with the medium of said first dispersion, mixing said first and said second dispersions together, permitting said dispersed polymerized material and said dispersed filling substance to coalesce and form an agglutinate of substantially uniformly dispersed filling substance in said polymerizable material. This mass may then be cured at ambient or elevated temperatures to provide a plastic or polymer with dispersed solid material therein.

The polymeric materials include polymer-forming, resinous and plastic materials which, upon curing by chemical means or the application of heat, or a combination of chemical means and heat application, form solid cohesive substances. The method described above serves as a process for the preparation of what is termed in the art as loaded plastics or paints and also in the preparation of putties.

The polymer or a precursor of the polymer, referred to hereinabove as a polymeric material, is usually in a partially polymerized viscous form. The dispersion of this polymeric material is therefore a dispersion of a liquid in a non-miscible and non-solvent liquid in proportions such that the weight ratio dispersed polymer or resin-to-dispersion medium is from about 1:19 to about 1:1. More dilute dispersions can also be employed but ordinarily are not in order to minimize the handling of excessive amounts of diluent. An example is the dispersion of a polymer of di(thioethoxy)methylene, having an average molecular weight of about 2000 and an ambient temperature viscosity of substantially 1000 centistokes, in n-heptane. The dispersion is formed by agitation as with a mechanical stirrer until the composition approaches a state of emulsion. This polymer dispersion is then blended with a dispersion of a filling material such as a dispersion of solid ammonium perchlorate in n-heptane.

The solid material which is dispersed is in a finely divided form of particle size ranging from about 1 to about 500 microns in diameter. This particle size is obtained by grinding, pulverizing or otherwise comminuting the solid. When the solid is a propellent fuel for rocket motors it is often desirable to have a combination of particles of two different size ranges, particles of a fine size having a diameter in the range of from about 1 to about 75 microns and particles of a coarse size having a diameter of from about 75 to about 500 microns. Particles of the fine size range could be used exclusively, however, the amounts of the fine and of the course sized particles are usually adjusted to provide for specifically required physical properties and burning rates. Hence it is preferred to employ solids containing a mixture of from about 5 weight-percent to about 90 weight-percent of the fine-sized particles and the balance of from about 95 weight-percent to about 10 weight-percent being the coarse-sized particles.

The solid particles are dispersed in a non-solvent, non-reactive vehicle, as for example, ammonium perchlorate in n-heptane, by mixing, stirring or other means of agitation. The ratio by weight of dispersed solid-to-dispersion mediums falls within the range of from about 1:19 to about 1:1. More dilute dispersions can also be used but are usually not employed in order to avoid handling excessive amounts of diluent. The dispersion medium is one which is miscible with the medium employed in dispersing the polymeric substance. The dispersed solid is then blended or mixed with the dispersed polymer in proportions such that the ratio of dispersed solid-to-dispersed polymer or resin is from about 1:24 to about 9:1 in parts by weight. The mixture is stirred, shaken, or otherwise agitated until a uniformly dispersed composition results. The temperature at which the dispersions and the blending are carried out is not critical. Ordinarily, these operations are carried out at ambient temperatures although temperatures of up to the boiling point of the diluent or dispersant can be used. The time required for agitation is also not critical and can vary from a few minutes to an hour or more. Following this, the composition is allowed to stand without agitation. The dispersed polymeric material and solid particles, upon contact, coalesce to form an agglutinate which settles out of the dispersion medium to form a composition of a uniformly dispersed solid in a binding material. The supernatant dispersion medium is then removed by decantation, evaporation or other means well known in the art. The solid-containing polymer, resin, or other binders may then be further treated if necessary. In the case of rocket propellants, the composition may be placed in a heated chamber for curing if the composition does not cure at ambient temperatures.

While the method of this invention may be performed as a batch process, it is preferred to carry out the processes in a continuous manner which eliminates the requirement for physical agitation to insure thorough mixing of the polymer and the solid being dispersed therein. This is accomplished by bringing separate streams of the polymeric materials and solid dispersions together into a common stream and effecting mixing by the turbulence set up at the point at which the two streams join. One method of accomplishing this is by metering a flow of one dispersion into a stream of the other dispersion as it is conducted from the dispersion container to a receiving vessel through a pipe or other appropriate channel. Another method of mixing is by bringing two channels of the separate dispersions together and allow mixing to be effected by the turbulence set up at the point of junction of the two channels. The proportions in which the two dispersions are combined is controlled by regulating the rate of feeding of the separate components from their respective containers into the channels.

For further illustration, reference may be had to the figures in the case. FIG. 1 illustrates a system in which two different dispersions are brought together and fed as a mixed stream into a receiving vessel. FIG. 2 illustrates a system in which a plurality of dispersions are fed into a common conduit and the resulting mixture collected in a receiving vessel. FIG. 3 illustrates a system in which the mixed dispersions are collected in a heated chamber in which the diluent is separated from the solid which is formed. The heat fluidized polymer or resin containing dispersed solid is fed from the heated chamber into a casting vessel.

In FIG. 1, a dispersion of a polymerizable material in a non-solvent and non-reactive liquid dispersion medium is contained in tank 1 and a dispersion of a filling substance also in a non-solvent and non-reactive liquid dispersion medium is contained in tank 2. The two dispersion mediums are mutually miscible. The dispersion from tank 1 is fed through line 4 into line 8 in an amount which is controlled by valve 3 in line 4. Simultaneously, the dispersion from tank 2 is fed through line 6 into line 8 in an amount which is likewise controlled by valve 5. The dispersions from tanks 1 and 2 come in contact with each other at junction 7 of the lines 4 and 6. The turbulence set up at this point causes efficient mixing of the two streams so that a uniformly dispersed composition is fed through line 8 into receiving vessel 9.

In FIG. 2, a plurality of different dispersed substances each in a non-solvent, non-reactive dispersion medium is contained in tanks 10, 11, 12 and 13. The dispersion mediums are mutually miscible. The dispersions from these tanks are fed through lines 15, 17, 20 and 23 respectively into common conduit 25. The amounts of these different dispersions that are fed into this common conduit are controlled by valves 14, 16, 19 and 22 shown in lines 15, 17, 20 and 23 respectively. A stream of dispersion from tank 10 passes through valve 14 and line 15 into common conduit 25. Streams of dispersion from tanks 11, 12 and 13 empty into conduit 25 at points 18, 21 and 24. The turbulence set up at the junction of these points is sufficient to cause efficient mixing of the various dispersions so that a uniformly dispersed composition of solid and binding material empties from the common conduit 25 into receiving vessel 26 where the dispersed resin and solid material forms an agglutinated mass which settles to the bottom of the receiving vessel.

In FIG. 3, individual dispersions are fed from tanks 26 and 27 in amounts controlled by valves 28 and 30 respectively through lines 29 and 31 into a common conduit 32 which empties into a heated chamber 33. In this chamber, the dispersed material coalesces forming an agglutinate 35 which settles to the bottom of the heated chamber while the supernatant diluent 34 is drawn off through line 36 to a storage vessel, not shown. A heating means 37 surrounds the heated chamber 33 and serves to maintain the agglutinate in a fluidized form. The fluidized agglutinate is fed through a control valve 38 into a casting or receiving vessel 39.

An embodiment of the instant invention is, therefore, a process for the manufacture of mixtures of polymeric materials and filling substances comprising providing at least one dispersion of polymerizable materials in a non-solvent and non-reactive liquid dispersion medium, and at least one dispersion of filling substances in a non-solvent and non-reactive liquid dispersion medium, the dispersion mediums being mutually miscible, each of the dispersions being contained in a separate container, simultaneously conducting a stream of each of the dispersions from the separate containers to a receiving vessel in a manner such that the streams of the dispersions come into mixing relationship with each other at a point intermediate the containers and the receiving vessel thereby providing a combined mixed stream of the dispersions, collecting the mixed stream in the receiving vessel, permitting the dispersed polymerizable materials and the dispersed filling substances to coalesce and form an agglutinated composition of substantially uniformly dispersed filling substance in the polymerizable material.

Thus, an embodiment of this invention is the process substantially as described in the previous paragraph with the modification that the receiving vessel serves also as a casting vessel and is equipped with heated casting means. The agglutinated and substantially uniform solids-polymer composition settles in the casting vessel, is heated by the heating means to a temperature sufficient to maintain it in a flowable though viscous form, and is cast into a mold such as a rocket engine. The agglutinated composition is heated in the casting vessel to a temperature of substantially 50° C. to 150° C. When the resin or polymer is a non-silicone containing polymer such as an epoxy resin or a polyurethane discussed elsewhere in this writing, the agglutinated composition is readily maintained in a flowable form for casting by heating to a temperature of substantially 50° C. to 80° C. When a silicone gum is used as the binder for the propellant, it should be heated to a temperature within the range of from about 80° C. to about 150° C. to make it readily castable. The heating also serves to aid in the elimination of any entrapped dispersion medium. This provides for a more compact end product which is free from pores ordinarily caused by the evaporation of entrapped liquid dispersion medium.

The process of this invention is useful in preparation of loaded plastics, propellent compositions, paints, or putties. Consequently, a variety of resins, polymer-forming and plastic-forming materials may be employed. Likewise, a variety of filling materials may be used as well as various polymerizing and curing agents.

Among the polymeric materials that are used in the process of this invention are substances such as polymerized di(thioethoxy)methylene, silicone polymers and rubbers of the type described in a text entitled "Chemistry of the Silicones," by E. G. Rochow, Second Edition (1951), published by John Wiley and Sons, Inc., New York. An example of a silicone polymer is a silicone gum obtained by heating a hydrolysate of a mixture of 90 mol percent dimethyldichlorosilane and 10 mol percent of diphenyldichlorosilane in the presence of a small amount of iron chloride. The composition is subjected to heating only for a period of time sufficient to obtain a viscous liquid. Another polymeric material that can be used is an epoxy compound such as a product obtained by the reaction of a mol of 2,2-bis(4-hydroxyphenyl)-propane with 1 or more mols of epichlorohydrin in the presence of a base such as sodium hydroxide. This gives a glycidyl polyether having terminal epoxy groups. Another example of a polymeric material is a polyurethan material such as a copolymer of polypropylene glycol and toluene diisocyanate. Other resins and polymeric substances that can be used will be apparent to those skilled in the art.

The solid substances with which the polymeric materials are loaded may be inert pigments such as titanium dioxide, lead oxide, ferric oxide, carbon black, powdered metals and alloys, metal fluorides, asbestos fibers, etc.

When the solids are oxidizing agents, as is the case in propellent compositions, they can be compounds such as metal perchlorates and metal nitrates. The metal perchlorates employed as oxidizing agents or oxygen carriers in the compositions are anhydrous and have the general formula $M(ClO_4)_x$ wherein M is $NH_4$ or a metal and $x$ is the valence of M. Since the propellent composition is required to withstand high temperature storage, it is preferable that the melting point and the decomposition temperatures of the oxidizer be as high as possible. The perchlorates of the group I-A, group I-B and group II-A metals are found to have the required high temperature stability and are employed in the preparation of propellent compositions by the process of this invention. Hence, the metal perchlorates used in the preparation of the propellent compositions include lithium perchlorate, sodium perchlorate, potassium perchlorate, rubidium perchlorate, and cesium perchlorate which are the perchlorates of the metals of group I-A of the periodic table of elements; silver perchlorate which is a perchlorate of a group I-B metal; and magnesium perchlorate, calcium perchlorate, strontium perchlorate, and barium perchlorate which are the perchlorates of the group II-A metals. In addition to the metal perchlorates, the compound ammonium perchlorate finds extensive use in propellent compositions. Examples of the nitrates of the group I-A, and I-B and II-B which are employed in preparing propellent compositions by the process of this invention are compounds such as lithium nitrate, sodium nitrate, potassium nitrate, magnesium nitrate, calcium nitrate, barium nitrate, strontium nitrate, etc. Ammonium nitrate is also used.

The ratio of solids-to-polymeric binder material in a propellant falls in the range of from about 1:1 to about 9:1 with an optimum ratio of about 7:3.

Other substances which are employed in the preparation of propellants by the process of this invention include minor amounts of burning catalysts, well-known in propellent compositions. These are composed of one or a mixture of two or more metal oxide powders in amounts sufficient to improve the burning rate of the composition. The amounts usually range from about 0.01 to about 3 weight-percent based on the weight of the oxidizer employed. The particle size of the powders can range from about 10 to about 250 microns in diameter. Non-limiting examples of metals that serve as burning catalysts are copper, vanadium, chromium, silver, molybdenum, zirconium, antimony, manganese, iron, cobalt and nickel. Examples of metal oxide burning catalysts are ferric oxide, aluminum, copper oxide, chromic oxide, as well as the oxides of the other metals mentioned above.

Curing catalysts can also be added in minor amounts to the dispersions in the performance of the process of this invention. When the catalysts are of a solid nature, they are dispersed together with the other solid materials. When the catalysts are liquid in form, they may be included with either the dispersion of the polymeric material or with the dispersion of the solid substance. If the catalyst is such that it brings about curing or setting up of the polymeric material at ambient temperatures, it is preferred to form a separate dispersion of such a catalyst or include it with the dispersion of the solid substance in order that the polymer does not set up prior to the formation of the agglutinate of the solid material and polymeric substance. Non-limiting examples of catalyst used for this purpose are aluminum chloride, tris-trimethylsilyl borate, benzoyl peroxide, and other catalysts well known in the curing of plastics, resins, polymers and rubbers. Examples of various catalysts may be found in text books such as "Synthetic Rubber," by G.S. Whitley, pp. 892–933, 1954 Ed., published by John Wiley and Sons, Inc., N.Y. The curing catalysts are added in amounts of from 0.1 to about 10 weight-percent based on the weight of the polymer, resin or elastomer, preferably 0.1 to 6 weight-percent.

The vehicles which are used as the dispersion mediums must be non-solvent with respect to the dispersed substances. The same medium may be used for both the polymeric material and the solid substances or conversely different vehicles or dispersion mediums may be employed for the polymer and the solid components. It is required only that the dispersion mediums for the two types of components be non-reactive to either the polymeric substances or the solid material and that the mediums employed for each of the polymeric and solid components be mutually miscible. Examples of dispersion mediums which are employed in the carrying out of the process of this invention include aliphatic and olefinic hydrocarbons having from about 3 to about 16 carbon atoms. Examples of these are propane, butane, hexane, heptane, octane, dodecane and hexadecane as well as 2-octene, 1-dodecene, 1-hexadecene, etc. Examples of cyclic hydrocarbons are cyclohexane, methylcyclohexane, etc. Examples of aromatic and alkyl-aromatic compounds which are employed as dispersion mediums include compounds having from 6 to about 16 carbon atoms such as benzene, toluene, xylene, 2,4-dipentylbenzene, phenyldecane, decalin, 1-hexyldecalin, etc. Halogen derivatives of the above hydrocarbons are also employed as dispersion mediums. Examples of these include ethylenedichloride, trichloroethylene, methylenedichloride, chlorobenzene, bromobenzene, iodobenzene. Compounds of the Freon series such as dichlorodifluormethane, dichlorotetrafluorethane, etc., may also be employed.

Other possible dispersion mediums are alcohols having from 1 to about 12 carbon atoms and from 1 to about 3 hydroxyl groups. Examples of these are methyl alcohol, ethyl alcohol, benzyl alcohol, glycerine, dodecyl alcohol, etc. Amines may also be used which have from about 2 to about 12 carbon atoms and from 1 to about 3 nitrogen atoms. These include such compounds as ethylenediamine, diethylenetriamine, dodecylamine, pyridine, quinoline, etc. Ethers, ketones, aldehydes and esters having from about 2 to about 16 carbon atoms are also used. Examples of these are ethylether, acetone, propionaldehyde, ethyl acetate, butyl dodecanoate, butyl Cellosolve, etc. The requirement in all of these cases is that the dispersion medium not be reactive to any of the polymeric or solid components employed and also that they be non-solvent toward these components. In addition, when different dispersion mediums are used for the polymeric and the solid components, it is necessary that these dispersion mediums be miscible one with the other. The properties of these various dispersion mediums with respect to miscibility and solvent power are well known to those skilled in the art and will not be discussed further in this writing.

The dispersions are formed with the aid of heat in cases where the dispersion medium is very viscous at ambient temperatures. The methods of preparing the dispersions themselves are well known and do not merit further discussion here.

The following examples will more fully illustrate the process of this invention:

EXAMPLE I

To a first container equipped with means for agitation were added, at ambient temperature, 475 parts by weight of n-heptane and substantially 24 parts by weight of di(thioethoxy)methylene polymer having an ambient viscosity of substantially 1000 centistokes and an average molecular weight of about 2000. The n-heptane and di(thioethoxy)methylene were subjected to agitation for a period of about 3 minutes until the mixture approached an emulsion state. To a second container, likewise equipped with agitation means, was added substantially 425 parts by weight of n-heptane and 71 parts by weight of ammonium perchlorate, 2.5 parts of paraquinone-dioxime, 1 part of ferric oxide and 0.45 part of sulphur. The ammonium perchlorate which was added consisted of 50 parts by weight of coarse grade particles having an average diameter of about 200 microns and about 21 parts by weight of fine grade particles having an average diameter of about 30 microns. The contents of the second container were subject to agitation until a uniform dispersion was obtained. The contents of the second container were then transferred to the first container and the combined dispersions then agitated vigorously for a period of approximately 30 seconds. The agitation causes the two dispersions to form a two-phase system of dispersed ammonia perchlorate and para-quinone-dioxime in the di(thioethoxy)methylene as a first phase, and in the n-heptane carrier as a second phase. The agitation was then discontinued and the dispersed polymer and dispersed solid particles then coalesced, forming an agglutinated composition which settled to the bottom of the container leaving a clear supernatant fluid consisting of the dispersion medium. The fluid was decanted off the agglutinated mass and the latter was placed in a furnace and maintained at a temperature of substantially 70° C. for a period of substantially 72 hours. At the end of this time, the product was found to have set up so that the particles of ammonium perchlorate were firmly held together by the polymer. The propellent composition had a firm but resilient texture and a high cohesive quality. The ratio of dispersed solid-to-binder in this composition was substantially 3:1.

In like manner, the process of Example I was employed to obtain a composition containing 4 weight percent manganese dioxide and 96 weight percent of an epoxy resin, obtained by reacting epichlorohydrin with 2,2-bis(4-hydroxycyclohexyl)propane, which was further copolymerized with dimethylaminomethyl phenol in the ratio of 26:1 by weight of epoxy compound-to-phenol compound.

EXAMPLE II

A first dispersion of the di(thioethoxy)methylene polymer in n-heptane was prepared in a first container, and a second dispersion of ammonium perchlorate together with para-quinone-dioxime, ferric oxide and sulphur n-heptane was prepared in a second container as described in Example I. Each of these containers was connected to one arm of a Y-shaped conduit adapted for transporting the dispersions to a receiving vessel. The arms of the conduit system which were attached to the first and the second containers were equipped with valves, the adjustment of which provided for the control of the amount of dispersion being allowed to flow from the individual first and second containers. The dispersion was allowed to flow from the first and second containers through a first and second arm respectively of the Y-shaped conduit system, the separate streams of the two dispersions coming into contact with each other at the junction of the arms of the Y-shaped conduit. At this junction, a turbulence was set up in the fluid due to the impact of one stream upon the other as the two combined into a mixing relationship. The mixed stream of the combined first and second dispersions formed a dispersion of ammonia perchlorate and para-quinone-dioxime in the di(thioethoxy)methylene polymer as a separate phase from the n-heptane carrier and this new two-phase system then continued its course along the third arm of the Y-shaped conduit system and emerged into a receiving vessel in a completely mixed and substantially uniformly dispersed state. The amounts of first and second dispersion flowing into the conduit system was controlled by the valves referred to above so as to provide a ratio of ammonium perchlorate and other solids-to-di(thioethoxy)methylene of substantially 3:1. When 1000 parts of the mixed first and second dispersion had been collected in the receiving vessel, it was set aside and the dispersion allowed to coalesce and settle. The supernatant liquid was then withdrawn and the agglutinated mass heat treated for a period of 24 hours at a temperature of substantially 120° F. The product consisted of a composition in which the ammonium perchlorate particles were firmly held together by the di(thioethoxy)methylene polymer. The composition had a firm and resilient texture and high cohesive quality.

EXAMPLE III

Four different dispersions, one each of ammonium nitrate, copper oxide, a polymer composition, and a plasticizer, were contained in 4 different containers. The ratio of dispersed substance-to-dispersion medium, consisting of toluene, in each case was substantially 1:19. The dispersed polymer composition consisted of 3.3 parts of 2,2-bis(2-chlorophenylamino)methylene, and 16.7 parts of a diisocyanate of a polyether of propylene glycol of the general formula

$$ONC-C_3H_6-O-[C_3H_6-O-]_nC_3H_6-CNO$$

wherein $n$ is a number taken from the series 0, 1, 2, 3, . . ., and having an average molecular weight of substantially 2500. The plasticizer was dioctyl azelate. The ammonium perchlorate was composed of fine-sized particles and course-sized particles in the weight ratio of substantially 19:1, fine-to-coarse. Each container was equipped with conduit means so as to permit the removal of the dispersion therefrom. Each conduit means was equipped with a valve means for regulating the amount of dispersion removed from the container. Each such conduit led from a dispersion container and opened into a common conduit which in turn emptied into a receiving vessel. The separate dispersions were simultaneously withdrawn, each through the conduit attached to its respective container, and emptied into the common conduit where thorough mixing of all the dispersions was effected by the turbulence set up by the inflow of the separate streams into the common conduit. The separate dispersions were fed into the common conduit in such proportions that the ratio of ammonium nitrate-to-copperoxide-to-2,2-bis(2-chlorophenylamino)-methylene-to-the diisocyanate compound was substantially 89:1:3.3: 16.7, and the ratio of solid-to-polymer was substantially 9:1. The mixed dispersions flowed out of the common conduit into the receiving vessel where the various dispersed substances coalesced to form an agglutinate consisting of uniformly dispersed particles of solid material in a polymer of uniform composition. The receiving vessel was equipped with an overflow valve for removing the supernatant dispersion medium. The receiving vessel served as a casting vessel and was equipped with heated feeding means for feeding the agglutinated composition into a mold such as a rocket motor. The temperature of the feeding means and of the agglutinated composition was maintained at substantially 50° C.

The casting vessel was connected to a vacuum vessel adapted to hold the mold or rocket motor and also equipped with means for agitating the mold or motor. A rocket motor casing with a Teflon-coated mandrel inserted through the exhaust chamber of the motor was placed in the vacuum chamber. The open front end of the rocket motor was placed beneath the heated feeder means of the casting vessel. The air was then withdrawn from the vacuum vessel causing the propellant composition to be fed from the casting vessel through the heated feeder means into the rocket motor casing. The motor casing was maintained in constant vibration by the agitating means during the casting. Sufficient heat was supplied to the heated feeder means to maintain the propellant composition at a viscosity which permitted the propellant composition to flow through the feeder means in a viscous form without freezing or blocking of the opening. The heat also served to drive off any entrapped dispersion medium. When the casing was filled, the closure cap was affixed to the front end of the rocket motor. The charged rocket motor was then subjected to elevated curing temperatures of substantially 50° C. for a period of about ten hours. The charge was cured to form a combustible composition which had a high cohesive quality.

The process of Example III was repeated with the modification that the binder material was the reaction product of 19 parts of 1,3-dimethyl urea with 56 parts of dilinoleic acid dimer, together with 74 parts of diglycidyl ether of triethylene glycol prepared by reacting 1,2-epoxy-3-chloropropane with triethylene glycol in the molar ratio of 2:1. The agglutinated composition was maintained at a temperature of substantially 80° C. while being fed through the heated feeding means into the rocket motor. The composition was cured by being maintained at a temperature of substantially 90° C. for a period of about 8 hours to produce a highly cohesive propellant.

EXAMPLE IV

The process of Example III was followed employing a first dispersion of a silicone elastomer in a toluene dispersion medium in which the weight ratio of polymer-to-dispersion medium was substantially 1:1, the silicone elastomer was a hydrolysate of a mixture of 90 mol percent dimethyldichlorosilane and 10 mol percent of diphenyldichlorosilane which was subsequently carefully heated with substantially 0.5 weight percent ferric chloride to convert the hydrolysate to a gum having an ambient viscosity of 1000 centistokes, and a second dispersion consisting of ammonium perchlorate in a trichloroethylene dispersion medium. The ammonium perchlorate was made up of 1 part of fine-sized particles and 20 parts of coarse-sized particles. The ratio by weight of dispersed solid-to-dispersion medium was substantially 1:1. The mixing of the two dispersions was conducted as in Example III and the amounts of each dispersion brought together was controlled so as to provide 21 parts of silicone elastomer per 78 parts of ammonium perchlorate. The ammonium perchlorate contained, in addition, 1 part of benzoyl peroxide. The material was cast into a rocket motor as in Example III while maintaining the temperature of the agglutinated composition at substantially 150° C. The propellant was then cured in the rocket motor by maintaining it at a temperature of substantially 200° C. for about 12 hours to provide a composition having a firm but resilient texture and high cohesive quality.

EXAMPLE V

The procedure of Example IV was repeated employing an ammonium perchlorate having 19 parts of fine-sized particles to 1 part of coarse-sized particles in a dispersion in which the ratio by weight of dispersed solid-to-dispersion medium consisting of toluene was substantially 1:19. The dispersion of the silicone gum also consisted of a weight ratio of dispersed polymer-to-toluene of substantially 1:19. The mixing of the dispersion was controlled so as to provide 1 part of solids per 1 part of silicone compound. A good product was thus obtained.

Other compositions prepared by the process of this invention as described in Example II in which the resinous or polymeric binder materials were contained in one dispersion and all the other substances were contained in a second dispersion, are shown in the following table:

Table

| Composition No. | Percent by Weight | | | | | | |
|---|---|---|---|---|---|---|---|
| | 1 | 2 | 3 | 4 | 5 | 6 | 7 |
| NH₄ClO₄, coarse | 50.03 | 60.00 | 50.03 | 50.03 | | | 49.00 |
| NH₄ClO₄, fine | 21.43 | 20.00 | 21.43 | 21.43 | | 20.00 | 21.00 |
| Para-quinone dioxime | 2.51 | 1.54 | 1.43 | 1.71 | 1.70 | | |
| Ferric Oxide | 1.01 | | 1.01 | 1.01 | 1.01 | | |
| Sulfur | 0.45 | 0.03 | 0.45 | 0.15 | | | 1.00 |
| Polymer A ᵃ | 24.57 | | 14.57 | 25.67 | | | |
| Diphenylguanidine | | 0.72 | | | 0.80 | | |
| Magnesium oxide | | 1.00 | | | | | |
| Polymer B ᵇ | | 16.71 | | | | | |
| Aluminum powder | | | 10.00 | | | 4.00 | |
| KClO₄, coarse | | | | | 54.00 | | |
| KClO₄, fine | | | | | 18.00 | | |
| Polymer C ᶜ | | | | | 25.50 | | |
| NH₄NO₃ granular | | | | | | 43.00 | |
| Epoxy resin D ᵈ | | | | | | 26.00 | |
| Dimethylamino methylphenol | | | | | | 1.00 | |
| Manganese oxide | | | | | | 4.00 | |
| Resin E ᵉ | | | | | | | 16.7 |
| Dioctyl Azelate | | | | | | | 9.8 |
| Methylene bis orthochloroanaline | | | | | | | 2.5 |

NOTE.—In the above table, the polymers A, B and C are partially polymerized polymeric materials having the general formula $$HS[SR-O-CH_2-O-RS]_nSH$$

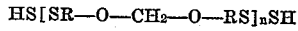

in which R is a hydrocarbon group and $n$ is a number selected from the series 1,2,3 .

ᵃ In polymer A, the "R" in the above formula represents a $C_2H_4$ group and "$n$" has an average value of 6.
ᵇ In polymer B, "R" in the above formula represents a $C_4H_8$ aliphatic group and "$n$" has an average value of 6.
ᶜ In polymer C, "R" in the above formula represents a $C_2H_4$ group and "$n$" has an average value of 20.
ᵈ Epoxy resin D is a glycidyl polyether having terminal epoxy groups on each polymer molecule. It is obtained by copolymerizing equimolar quantities of epichlorohydrin and 2,2-bis 4 hydroxycyclohexyl propane in the presence of a base such as sodium hydroxide to a product having a viscosity of substantially 1000 centistokes.
ᵉ Resin E is a diisocyanate of a polyether of propylene glycol having the general formula $$ONC-C_3H_6-O-[C_3H_6-O]_n-C_3H_6-CNO$$

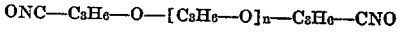

and having a molecular weight of from 2000 to 3000.

The Resin D and dimethylamino-methylphenol of composition 6 were contained in one dispersion in the process of preparation. In like manner, Resin E, dioctyl azelate, and methylene bis orthochloroaniline of composition 7 were dispersed together in one container.

The dispersion medium employed in the preparation of the compositions shown in the table was n-heptane. The ratios by weight of dispersed substance-to-dispersion medium varied from about 1:19 to about 1:5.

In order to test the performance of the propellants prepared by the process of this invention, the procedure was employed as described in the following example:

EXAMPLE VI

The procedure of Example II was followed employing a receiving vessel which was 2 inches in diameter and of sufficient length to accommodate in excess of 6 inches of agglutinated propellent mixture. After curing of the propellant at substantially 120° C. for a period of 24 hours, the cylindrically shaped propellant was removed from the mold or receiving vessel and the surface, except for one end, covered with a surface burning inhibiting coating composed of a lacquer of ethylcellulose. The uncoated end was ignited and was found to have an ignition temperature of over 175° C. and burned evenly. The physical properties of the composition were unchanged by heating to 150° C.

The burning rate of the propellants of this invention was determined by the Crawford strand burning rate procedure as set out in the Office of Scientific Research Development Bulletin No. 6374. This procedure is referred to in Solid Propellant Information Agency Abstract under the number 0662. The propellant of Example I was found to burn at the rate of 0.4 inch per second. The propellant compositions of Examples II–V had similar burning rates.

The testing performance of rockets containing the propellants of this invention consisted of firing the rocket while anchored to a stand. The rocket was ignited by electrically actuating an igniter of a pyrotechnic composition placed in the firing chamber of the rocket. The pyrotechnic composition is composed of such material as black powder or a mixture of ammonium perchlorate and powdered metal such as aluminum, iron, magnesium, etc. The pressure generated within the firing chamber of the rocket is measured by means of a pressure pickup. The thrust is measured by attaching the motor to a thrust cell which contains a strain gage adapted to indicate the magnitude of the thrust on an oscillograph to which it is connected. The rocket propellant composition of this invention, when tested in motors by this procedure, all give good results with respect to the combustion chamber pressure and thrust.

Rocket motors charged with the composition of this invention give good performance with respect to flight and range on firing.

The process of this invention is adaptable to the preparation of compositions of uniformly dispersed solid material in polymers which are ordinarily polymerized in solution. In this case, dispersions of the polymer components, as well as of the solid materials, are prepared, mixed together, and the polymerization allowed to proceed while the components are in the dispersed state and as the dispersed substances coalesce to form an agglutinate.

Although the invention has been described and illustrated in detail, it is to be clearly understood that the same is by way of illustration and example only and is not to be taken way of limitation, the spirit and scope of this invention being limited only by the terms of the appended claims.

I claim:

1. In a process for the manufacture of a composition comprising substantially uniformly dispersed solid particulate substances in an organic polymer, the improvement which comprises mixing, under turbulent conditions, at least one liquid organic material which forms a propellant fuel binder upon curing with at least one solid particulate filling substance having a particle size of at least one micron, said mixing being conducted in an inert non-solvent liquid carrier; said turbulent conditions operating to combine said filling substance and said liquid organic material into a dispersion on contact such that said dispersion, upon the release of turbulent conditions and in the absence of added colloid coagulating agents separates from said carrier, and upon curing said dispersion is further characterized in that it forms a solid cohesive substance of substantially uniform composition.

2. The process of claim 1, wherein said solid particulate filling substance is selected from the group consisting of carbon, asbestos fibers, powdered metals, powdered metal alloys, metal fluorides, metal oxides, inorganic perchlorates having the general formula $$M(ClO_4)_x$$

wherein M is selected from the class consisting of $NH_4$, group I–A metals, group I–B metals and group II–A metals of the periodic table of elements, and $x$ is the valence of M, ammonium nitrate, group I–A metal nitrates, group I–B metal nitrates and group II–B metal nitrates.

3. A process for the manufacture of mixtures of polymeric materials and filling substances which comprises providing (1) at least one dispersion of polymer-forming materials in non-solvent and non-reactive liquid organic dispersion mediums, wherein said polymer-forming materials consist essentially of at least one component selected from the class consisting of silicone polymers, silicone rubbers, glycidyl polyethers having terminal epoxy groups, polyurethane material, polymerized di(thioethoxy)methylene, partially polymerized materials having the general formula $$HS(SR-O-CH_2-O-RS)_nSH$$

in which R is a hydrocarbon group and $n$ is a number selected from the series 1, 2, 3 . . ., and isocyanate resins having the general formula $$ONC-C_3H_6-O(C_3H_6-O)_n-C_3H_6-CNO$$

wherein $n$ is as defined above such that the molecular weight is from about 2,000 to about 3,000, and wherein the ratio by weight of polymer-forming materials-to-dispersion mediums in (1) is from about 1:19 to about 1:1 and (2) at least one dispersion of solid particulate filling substances consisting essentially of inorganic perchlorates in non-solvent and non-reactive liquid organic dispersion mediums wherein the ratio by weight of solid particulate substances-to-dispersion mediums in (2) is from about 1:19 to about 1:1, said dispersion mediums being mutually miscible, providing an individual stream of each of said dispersions, bringing said streams together under conditions of turbulence to form a common stream of uniform composition, the amount of each of said dispersions supplied to said common stream by each of said individual streams being such that the ratio by weight of said filling substances-to-said polymer-forming materials in said common stream is from about 1:24 to about 9:1, collecting said composition and permitting said dispersed polymerized materials and said dispersed filling substances to coalesce and form an agglutinated composition of substantially uniformly dispersed filling substances in said polymerizable materials.

4. The process of claim 3, wherein the amount of each of said dispersions supplied to said common stream by each of said individual streams is such that the ratio by weight of said filling substances-to-said polymer-forming materials in said common stream is from about 1:1 to about 9:1.

5. In a process for the manufacture of a solid propellant grain comprising substantially uniformly dispersed solid particulate substances in an organic polymer, the improvement which comprises mixing, under turbulent conditions, at least one liquid organic polymer-forming material which forms a propellant fuel binder upon curing with at least one solid particulate filling substance having a particle size of at least one micron, said mixing being conducted in an inert non-solvent liquid carrier; said turbulent conditions operating to combine said filling substances and said liquid organic polymer-forming material into a dispersion on contact such that said dispersion, upon the release of turbulent conditions and in the absence of added colloid coagulating agents separates from said carrier, said dispersion further characterized in that, upon curing, it forms a solid cohesive substance of substantially uniform composition.

6. In a process for the manufacture of a solid propellant grain comprising substantially uniformly dispersed solid particulate substances in an organic polymer, the improvement which comprises continuously mixing, under turbulent conditions, in a mixing zone, incremental portions of at least one liquid organic material which forms a propellant fuel binder upon curing with at least one solid particulate filling substance having a particle size of at least one micron, said mixing being conducted in at least one inert non-solvent liquid carrier; said turbulent conditions operating to combine said filling substances and said liquid organic material into a dispersion on contact such that said dispersion, upon the release of turbulent conditions and in the absence of added colloid coagulating agents separates from said carrier and said dispersion further characterized in that, upon curing, it forms a solid cohesive substance of substantially uniform composition.

7. In a process for the manufacture of a solid propellant grain comprising substantially uniformly dispersed solid particulate substances in an organic polymer, the improvement which comprises continuously mixing, under turbulent conditions, in a mixing zone, incremental portions of at least one first dispersion of a liquid organic polymer-forming material which forms a propellant fuel binder upon curing in non-solvent inert liquid dispersion media with at least one second dispersion of a solid particulate filling substance having a particle size of at least one micron in inert non-solvent liquid dispersion media, said dispersion media being mutually miscible; said turbulent conditions operating to combine said filling substances and said polymer-forming material into a new dispersion on contact of said first and second dispersions, removing said new dispersion and said dispersion media from said mixing zone, bringing said new dispersion and said disperson media to a quiescent state to separate said new dispersion media in the absence of added colloid coagulating agents, removing said new dispersion from said dispersion media and curing said new dispersion to form a solid cohesive substance of substantially uniformly dispersed solid particulate substances in said organic polymer.

8. In a process for the manufacture of a solid propellant grain comprising substantially uniformly dispersed solid particulate substances in an organic polymer, the improvement which comprises continuously mixing, under turbulent conditions, in a mixing zone, incremental portions of at least one first dispersion of a liquid organic polymer-forming material which forms a propellant fuel binder upon curing in non-solvent inert liquid organic dispersion media, wherein the ratios by weight of liquid organic polymer-forming material to dispersion media is from about 1:19 to about 1:1, with at least one second dispersion of a solid particulate filling substance having a particle size of at least one micron in inert non-solvent liquid organic dispersion media, wherein the ratio by weight of solid particulate filling substance to dispersion media is from about 1:19 to about 1:1, said dispersion media being mutually miscible; said dispersions being mixed in proportions such that the ratio in parts by weight of solid particulate filling substance to liquid organic polymer-forming material is from about 1:24 to about 9:1, said turbulent conditions operating to combine said filling substances and said polymer-forming material into a new dispersion on contact of said first and second dispersions, removing said new dispersion and said dispersion media from said mixing zone, bringing said new dispersion and said dispersion media to a quiescent state to separate said new dispersion from said dispersion media in the absence of added colloid coagulating agents, removing said new dispersion from said dispersion media and curing said new dispersion to form a solid cohesive substance of substantially uniformly dispersed solid particulate substances in said organic polymer.

9. The process of claim 8, wherein said solid particulate filling substance is an inorganic oxidizing agent.

10. The process of claim 8, wherein said polymer-forming material is an epoxide-forming material.

11. The process of claim 8, wherein said solid particulate filling substance is a metal powder.

12. A process for the manufacture of a rocket propellant comprising providing a first dispersion of a liquid organic polymer-forming material, which forms a propellant fuel binder upon curing, in a non-solvent and non-reactive liquid organic dispersion medium in a first container wherein the ratio by weight of polymer-forming material-to-dispersion medium is from about 1:19 to about 1:1, and in a second container, a second dispersion of an inorganic perchlorate in a non-solvent and non-reactive liquid organic dispersion medium wherein the ratio by weight of perchlorate-to-dispersion medium in said second dispersion is from about 1:19 to about 1:1, and wherein said dispersion medium in said second dispersion is miscible with the medium of said first dispersion, withdrawing a stream of said first dispersion from said first container to a receiving vessel and simultaneously withdrawing a stream of said inorganic perchlorate dispersion from said second container to said receiving vessel in a manner such that the ratio by weight of said inorganic perchlorate-to-said polymer-forming material in said stream is from about 1:1 to about 9:1, said stream of said inorganic perchlorate dispersion being conducted so as to come into mixing relationship with said stream of said first dispersion at a point intermediate said first container and said receiving vessel, thereby providing a combined mixed stream of said first dispersion and said second dispersion, said individual dispersions being fed into said streams in such amounts that the ratio of inorganic perchlorate-to-polymer-forming material in said combined mixed stream is from about 1:1 to about 9:1, collecting said mixed stream in said receiving vessel, permitting said dispersed polymerizable material and said dispersed inorganic perchlorate to coalesce and form an agglutinate of substantially homogeneously dispersed inorganic perchlorate in said polymerizable material.

13. A process for the manufacture of a rocket propellant comprising providing a first dispersion of liquid di(thioethoxy) methylene polymer in n-heptane wherein the ratio by weight of said di(thioethoxy)methylene polymer-to-n-heptane in said first dispersion is from about 1:19 to about 1:1, and a second dispersion of ammonium perchlorate in n-heptane wherein the ratio by weight of said perchlorate-to-n-heptane in said second dispersion is from about 1:19 to about 1:1, together with minor amounts of curing and burning catalysts, providing a first stream of said first dispersion and a second stream of said second dispersion, bringing said streams together under conditions of turbulence to form a common stream of uniform composition, the amount of each of said dispersions supplied to said common stream by said first stream and said second stream being such that the ratio by weight of said ammonium perchlorate-to-said di(thioethoxy)methylene is from about 1:1 to about 9:1, collecting said composition and permitting said dispersed polymer and said dispersed ammonium perchlorate to coalesce and form an agglutinated composition of substantially uniformly dispersed inorganic perchlorate in said di(thioethoxy)-methylene polymer.

14. A process for the manufacture of a rocket propellant comprising providing a first dispersion of liquid di(thioethoxy)methylene polymer in n-heptane wherein the ratio of said polymer to said n-heptane in said first dispersion is from about 1:19 to about 1:1, and a second dispersion of ammonium perchlorate together with minor amounts of curing and burning catalysts in n-heptane wherein the ratio by weight of said perchlorate-to-said n-heptane in said second dispersion is from about 1:19 to about 1:1, providing a first stream of said first dispersion and a second stream of said second dispersion, bringing said streams together under conditions of turbulence to form a common stream of uniform composition, the amount of each of said dispersions supplied to said common stream by said first stream and said second stream being such that the ratio by weight of said ammonium perchlorate-to-said di(thioethoxy)methylene is from about 1:1 to about 9:1, collecting said composition and permitting said dispersed polymer and said dispersed ammonium perchlorate to coalesce and settle so as to form an upper layer of n-heptane and a lower layer of agglutinated composition of substantially uniformly dispersed ammonium perchlorate in said di(thioethoxy)methylene polymer, heating said lower layer of said agglutinated composition to a temperature sufficient to maintain it in a flowable viscous form, withdrawing a portion of said heated agglutinated composition from said lower layer and collecting said heated agglutinated composition.

15. A process for the manufacture of a rocket propellant comprising providing a first dispersion of liquid di(thioethoxy)methylene polymer in n-heptane wherein the ratio by weight of said di(thioethoxy)methylene polymer-to-n-heptane in said first dispersion is from about 1:19 to about 1:1, and a second dispersion of ammonium perchlorate in n-heptane wherein the ratio by weight of said perchlorate-to-n-heptane in said second dispersion is from about 1:19 to about 1:1 together with minor amounts of curing and burning catalysts, conducting a stream of said first dispersion from said first container to a receiving vessel and simultaneously conducting a stream of said ammonium perchlorate dispersion from said second container to said receiving vessel in a manner such that said stream of ammonium perchlorate dispersion comes into mixing relationship with said di(thioethoxy)methylene polymer dispersion at a point intermediate said first container and said receiving vessel thereby providing a combined mixed stream of said polymer dispersion and said ammonium perchlorate dispersion, said dispersions being fed into said streams from said containers in such amounts that the ratio of ammonium perchlorate-to-polymer in said combined mixed streams is from about 1:1 to about 9:1, collecting said mixed stream in said receiving vessel, permitting said dispersed polymer and said dispersed ammonium percholate to coalesce and form an agglutinated composition of substantially homogeneously dispersed ammonium perchlorate in said di(thioethoxy)methylene polymer.

16. A process for the manufacture of a rocket propellant comprising providing a first dispersion of liquid di(thioethoxy)methylene polymer in n-heptane wherein the ratio of said polymer to said n-heptane in said first dispersion is from about 1:19 to about 1:1, and a second dispersion of ammonium perchlorate together with minor amounts of curing and burning catalysts, in n-heptane wherein the ratio by weight of said perchlorate-to-said n-heptane in said second dispersion is from about 1:19 to about 1:1, withdrawing and conducting a stream of said first dispersion from said first container to a receiving vessel and simultaneously withdrawing and conducting a stream of said ammonium perchlorate dispersion from said second container to said receiving vessel in a manner such that said stream of ammonium perchlorate dispersion comes into mixing relationship with said liquid di(thioethoxy)methylene polymer dispersion at a point intermediate said first container and said receiving vessel thereby providing a combined mixed stream of said polymer dispersion and said ammonium perchlorate dispersion, said dispersions being fed into said streams from said containers in such amounts that the ratio of ammonium perchlorate-to-polymer in said combined mixed streams is from about 1:1 to about 9:1, collecting said mixed stream in said receiving vessel, permitting said dispersed polymer and said dispersed ammonium perchlorate to coalesce and settle so as to form an upper layer of n-heptane and a lower layer of an agglutinated composition of substantially homogeneously dispersed ammonium perchlorate in said di(thioethoxy)methylene polymer, heating said lower layer of said agglutinated composition to a temperature sufficient to maintain it in a flowable viscous form, withdrawing said heated agglutinated composition from said receiving vessel and collecting said withdrawn composition in a mold.

References Cited in the file of this patent

UNITED STATES PATENTS

| | | |
|---|---|---|
| 2,769,795 | Braendle | Nov. 6, 1956 |
| 2,819,243 | Baker et al. | Jan. 7, 1958 |

FOREIGN PATENTS

| | | |
|---|---|---|
| 655,585 | Great Britain | July 25, 1951 |